(12) United States Patent
Sisson et al.

(10) Patent No.: US 10,678,995 B2
(45) Date of Patent: Jun. 9, 2020

(54) SYSTEM AND METHODS FOR CONTROL OF CONTENT PRESENTED ON WEB PAGES

(71) Applicant: NETSUITE INC., San Mateo, CA (US)

(72) Inventors: Ethan Aaron Sisson, Norman, OK (US); Matthew Mark Grimm, Midwest City, OK (US)

(73) Assignee: NETSUITE, INC., San Mateo, CA (US)

(*) Notice: Subject to any disclaimer, the term of this patent is extended or adjusted under 35 U.S.C. 154(b) by 100 days.

(21) Appl. No.: 15/656,755

(22) Filed: Jul. 21, 2017

(65) Prior Publication Data

US 2018/0046602 A1 Feb. 15, 2018

Related U.S. Application Data

(60) Provisional application No. 62/374,228, filed on Aug. 12, 2016.

(51) Int. Cl.
| | |
|---|---|
| *G06F 40/166* | (2020.01) |
| *G06F 3/0484* | (2013.01) |
| *G06F 16/958* | (2019.01) |
| *G06F 40/14* | (2020.01) |
| *H04L 29/08* | (2006.01) |
| *H04L 29/06* | (2006.01) |

(52) U.S. Cl.
CPC ........ *G06F 40/166* (2020.01); *G06F 3/04845* (2013.01); *G06F 16/972* (2019.01); *G06F 40/14* (2020.01); *H04L 67/02* (2013.01); *H04L 67/42* (2013.01)

(58) Field of Classification Search
CPC ............... G06F 17/24; G06F 17/2247; G06F 17/30893; G06F 3/04845; G06F 16/972; G06F 40/166; G06F 40/14; H04L 67/02; H04L 67/42
See application file for complete search history.

(56) References Cited

U.S. PATENT DOCUMENTS

| | | | |
|---|---|---|---|
| 7,430,712 B2 | 9/2008 | Arokiaswamy | |
| 7,533,144 B2 | 5/2009 | Kassab | |
| 9,733,921 B1 | 8/2017 | Saenz et al. | |
| 9,817,991 B2 | 11/2017 | Boncha et al. | |
| 2009/0300496 A1* | 12/2009 | Fan | G06F 17/30867 715/711 |
| 2010/0251095 A1* | 9/2010 | Juvet | G06F 17/30893 715/234 |

(Continued)

*Primary Examiner* — Joy M Weber
(74) *Attorney, Agent, or Firm* — Kraguljac Law Group, LLC

(57) ABSTRACT

A system architecture and related methods for controlling and/or modifying the content presented by a web site on one or more web pages. The system and methods enable an administrator or manager to efficiently update, revise, or otherwise maintain the content presented to a viewer on a web page, where such content may be subject to change or variation based on data related to the operation of a business for which the web site or web page is presented. The architecture, coupled with the methods for content or user interface representation and manipulation, enable a website administrator, manager, or other party to more efficiently control the content presented to a viewer of the site or page, where the viewer may be a customer or employee of a business.

17 Claims, 8 Drawing Sheets

(56) References Cited

U.S. PATENT DOCUMENTS

| | | | |
|---|---|---|---|
| 2011/0161990 A1* | 6/2011 | Smith | G06F 17/30861 719/328 |
| 2013/0198607 A1* | 8/2013 | Mischook | G06F 17/30905 715/234 |
| 2013/0198609 A1* | 8/2013 | Mokhtarzada | G06F 3/048 715/234 |
| 2015/0040013 A1* | 2/2015 | Casalaina | G06F 17/30528 715/734 |
| 2017/0295414 A1* | 10/2017 | Murray | H04N 21/4725 |
| 2018/0081976 A1 | 3/2018 | Dejuan et al. | |

* cited by examiner

```
<div class="ns_Frame">
    <iframe class="ns_Frame--iframe"></iframe>
    <div class="ns_Overlay">
        <div class="ns_Overlay--scroll"></div>
        <div class="ns_Overlay--noScroll"></div>
    </div>
</div>

.ns_Frame {
    position: absolute;
    top: 0;
    right: 0;
    bottom: 0;
    left: 0;
}
.ns_Frame--iframe {
    width: 100%;
    height: 100%;
}
.ns_Overlay {
    position: absolute;
    top: 0;
    right: 0;
    bottom: 0;
    left: 0;
}
```

Figure 4(c)

```
var element_bounds = element.getBoundingClientRect(),
    top = element_bounds.top + window.pageYOffset,
    right = element_bounds.right + window.pageXOffset,
    bottom = element_bounds.bottom + window.pageYOffset,
    left = element_bounds.left + window.pageXOffset,
    x_center = (left + right) / 2,
    y_center = (top + bottom) / 2,
    width = element_bounds.right - element_bounds.left,
    height = element_bounds.bottom - element_bounds.top;

var coordinates = {
    top: top,
    right: right,
    bottom: bottom,
    left: left,
    x_center: x_center,
    y_center: y_center,
    width: width,
    height: height
};
```

Figure 4(d)

```
<div class="ns_Toolbar"> ... </div>
<div class="ns_Well">
    <div class="ns_Frame">
        <iframe class="ns_Frame--iframe"></iframe>
        <div class="ns_Overlay"> ... </div>
    </div>
</div>

.ns_Frame {
    position: absolute;
    top: 0;
    right: 0;
    bottom: 0;
    left: 0;
}
.ns_Frame--iframe {
    width: 100%;
    height: 100%;
}
.ns_Overlay {
    position: absolute;
    top: 0;
    right: 0;
    bottom: 0;
    left: 0;
}
```

Figure 4(e)

```
var inverseRatio = function (ratio) {
    var difference = 1 - ratio;

if (difference > 0) {
        return difference / (difference * ratio);
    } else {
        return 1;
    }
}
```

Figure 4(f)

SYSTEM AND METHODS FOR CONTROL OF CONTENT PRESENTED ON WEB PAGES

CROSS REFERENCE TO RELATED APPLICATION

This application claims the benefit of U.S. Provisional Application No. 62/374,228, entitled "System and Methods for Control of Content Presented on Web Pages," filed Aug. 12, 2016, which is incorporated by reference in its entirety (including the Appendix) herein for all purposes.

BACKGROUND

Managing the arrangement and display of content on a web page is an important aspect of presenting a web page or web site to a viewer, such as a customer. However, conventional content management systems (CMS) rely on in-context content management tools that have inherent limitations related to code conflicts between web page code and CMS code, and limitations related to the presentation of the CMS user interface on an existing web page.

In-context content management systems enable users to add and edit content on a webpage or website, and manage/configure other aspects of a website (such as site navigation) without leaving the site to use a "backend" administration tool. If the user is logged-in to the CMS, tools for content editing and configuration are displayed in the context of the web page, and modifications are made by navigating to the page where changes are required and using the in-context editing user interface. Ideally, a user should be able to see the page at all times while actively editing, as opposed, for example, to being taken to a separate administration page to fill out a form. However, while convenient, a problem with in-context content management systems is that the website and editing tools exist in the same environment (i.e., in a single web browser window/tab). This creates problems in at least two ways; firstly, with regards to possible code conflicts, and secondly with regards to problems in effectively utilizing the user interface for CMS.

Embodiments of the inventive system and methods are directed to overcoming the limitations associated with conventional approaches to providing these management capabilities, both individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention provide a system architecture and related methods for controlling and/or modifying the content presented by a web site on one or more web pages. The inventive system and methods enable an administrator or manager to efficiently update, revise, or otherwise maintain the content presented to a viewer on a web page, where such content may be subject to change or variation based on data related to the operation of a business for which the web site or web page is presented. The inventive architecture, coupled with the inventive methods for content or user interface representation and manipulation, enable a website administrator, manager, or other party to more efficiently control the content presented to a viewer of the site or page, where the viewer may be a customer or employee of a business.

In one embodiment, the invention is directed to a system for use in managing the contents of a web page or web pages, where the system includes:

a website dedicated to the content management operations;

a rendering engine configured to render content associated with a selected web page in an iframe embedded in a web page accessible from the website;

a user interface configured to provide a user with an ability to modify the content associated with the selected web page; and a messaging component operative to exchange a message or messages between the user interface and the rendering engine, wherein the messaging component generates a message regarding an event or data in response to a user input or action received at the user interface the user input or action including changing the content on the selected web page.

In another embodiment, the invention is directed to a method for use in managing the contents of a web page or web pages, where the method includes:

enabling a user to navigate to a website dedicated to the content management operations;

operating a rendering engine configured to render content associated with a selected web page in an iframe embedded in a web page accessible from the website;

providing a user interface configured to provide the user with an ability to modify the content associated with the selected web page;

receiving one or more inputs from the user via the user interface;

generating one or more messages operative to exchange events and data between the user interface and the rendering engine in response to the inputs received from the user, wherein the user inputs include an input that results in changing the content on the selected web page; and modifying the content associated with the selected web page in response to the one or more messages.

In yet another embodiment, the invention is directed to a non-transitory computer readable medium containing a set of instructions, which when executed by one or more programmed electronic processing elements cause the one or more processing elements to carry out a method for managing web page content, the method including:

enabling a user to navigate to a website dedicated to the content management operations;

operating a rendering engine configured to render content associated with a selected web page in an iframe embedded in a web page accessible from the website;

providing a user interface configured to provide the user with an ability to modify the content associated with the selected web page;

receiving one or more inputs from the user via the user interface;

generating one or more messages operative to exchange events and data between the user interface and the rendering engine in response to the inputs received from the user, wherein the user inputs include an input that results in changing the content on the selected web page; and modifying the content associated with the selected web page in response to the one or more messages.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which:

FIGS. 4(a) through 4(f) are diagrams illustrating aspects of the implementation of an embodiment of the inventive system and methods; FIG. 4(a) illustrates certain of the functional elements or components of the inventive architecture and the relationship between those elements or components, FIG. 4(b) is a flow chart or flow diagram illustrating certain of the operations, functions, or processes that may be used as part of implementing an embodiment of the inventive system or architecture; FIG. 4(c) is an example of code that may be used to keep the Overlay aligned with the iframe element; FIG. 4(d) is an example of code that may be used by the Base element to position the Overlay Outline for an object; FIG. 4(e) is an example of code that may be used to implement a frame positioning function or operation as part of implementing an embodiment of the inventive system; and FIG. 4(f) is an example of code that may be used to implement a frame resizing function or operation by determining the inverse of the scaling ratio.

Note that the same numbers are used throughout the disclosure and figures to reference like components and features.

DETAILED DESCRIPTION

Figure 1:
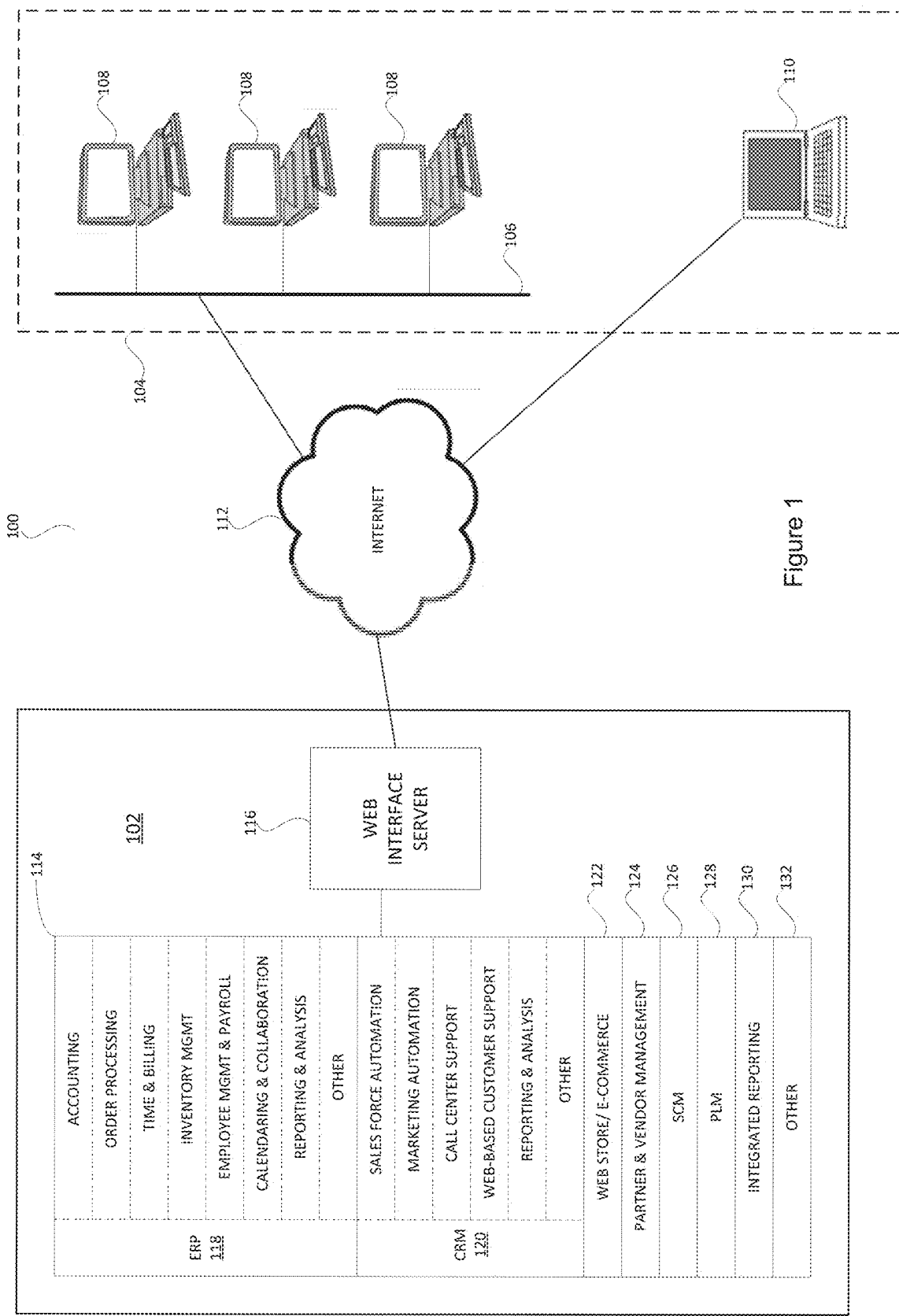
FIG. 1 is a diagram illustrating a system, including an integrated business system and an enterprise network in which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that is part of a client device, server, network element, or other form of computing or data processing device/platform and that is programmed with a set of executable instructions (e.g., software instructions), where the instructions may be stored in a suitable data storage element (for example, a non-transitory computer readable medium). In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

As mentioned, conventional approaches to in-context management of content on webpages and web sites typically encounter problems related to code conflicts and the arrangement of a content management user interface. These two problems and disadvantages of conventional content management systems are described below in greater detail before further describing the implementation of one or more embodiments of the inventive system and methods.

(Potential) Code Conflicts

The code for the website and the CMS, both consisting of their own HTML, JavaScript, and CSS, is loaded on the web page. The primary reason this is a problem is that the code for the website and the CMS are likely to conflict with each other in various ways, having unexpected and undesirable effects. There are several ways that this can happen, and anticipating and preventing these conflicts ranges from impractical to impossible:

For example, one potential conflict is between JavaScript libraries. If the website and the CMS both need to utilize a certain JavaScript library, then the library will be included by both, creating two instances of the library on the page. Some libraries support multiple instances, but require special configuration to enable this support. Many libraries do not support multiple instances. This sort of conflict will probably result in an error when the code executes, which the website developer will need to troubleshoot. It is possible that no error occurs but that the two instances of the library still conflict with each other, causing incorrect behaviors that are difficult to troubleshoot. If the library does not support multiple instances, then only the website or the CMS will be able to use that library, but not both;

Another potential conflict that is likely to occur is between the website CSS and the CSS for the CMS UI. CSS almost always includes style rules that are broadly applied to many HTML elements depending on a combination of factors such as the kind of element, CSS classes applied to the element, and the element's position in the DOM. For example, a website developer may set the font-size property of p (paragraph) elements using a broad rule. The rule applies to any p element, so the website's rule will match all p elements created by the CMS and attempt to apply the font-size. The CMS CSS might not explicitly set a font-size on p elements, instead intending for their font-size to be inherited from their parent element, which may have a different setting for the font size. There are innumerable ways that CSS conflicts like this can occur when the website code and the CMS code are on the same page. Anticipating and attempting to prevent all or even most of them is impractical in most cases;

Code conflicts can also occur in other ways, including the website code attempting to modify website elements but unintentionally modifying CMS UI elements or changing their position in the DOM or removing them, the presence and/or styling of the CMS UI elements breaking the website's appearance, and the website unintentionally applying behaviors to CMS UI that are intended to apply only to website elements (e.g. form field validation). The potential impact of code conflicts includes preventing the website and/or the CMS from loading, making parts of the CMS UI behave incorrectly, inconsistently, or not work at all, causing incorrect appearance and/or position of CMS UI elements, etc.;

In addition to code conflicts, another reason that the website code and CMS code coexisting is a problem is that the code for CMS editing tools is always downloaded when someone visits the website, even if it is not needed because the visitor is not logged in to the CMS. This is a significant amount of code and slows down the loading of the website for all visitors.

User Interface Arrangement and Management

The user interface for a conventional in-context CMS editing tool typically encounters a problem that arises because the web page itself fills the browser viewport. Since there is limited space available, toolbars and other UI panels generally must overlap and cover parts of the page in order to avoid affecting the website layout and the position of content within it. This is a problem because the CMS UI may cover some part of the page at a time when the user needs to see or interact with that part of the page. There are CSS techniques that can effectively push the entire page downward to make room for a toolbar at the top of the viewport, but this has a risk of breaking the design or specialized behaviors (e.g. custom scrolling interactions) of some websites.

Apart from a top toolbar, there is virtually no other option but for CMS UI elements to overlap the page. For some parts of the UI, this can be appropriate and even desirable. For example, a section of text on a page might have buttons to invoke editing or deleting the text. It makes sense for these buttons to be overlaid on the page near or on top of the content that they will modify. UI elements like these typically occupy a relatively small space, and so may overlap the page without getting in the way of viewing and navigating the website. However, other UI elements, such as a form for configuring a page's settings or a list of recent changes to content require significantly more space:

Imagine a user clicks a button to configure a piece of content and a form panel is shown on the right side of the window, overlapping the page. If the content being edited is on the right side of the page (or spans the width of the page), then the user is prevented from seeing the effects of his changes until after he dismisses the panel. This would be frustrating and may prevent the user from accurately making the desired changes;

In addition to parts of the web page being covered, the limitations on placement of UI elements may cause other problems and challenges in designing a user interface. For example, because the placement of UI elements is severely constrained by an essentially immovable web page filling the browser viewport, many standard user interface design conventions and patterns can't be implemented or can't be used in a logical way. This constraint may apply to conventions or tools typically used for navigating within an application, modal states, and other information architecture issues.

Embodiments of the inventive system and methods are directed to an architecture and operational processes for implementing a content management system (CMS) to control the presentation of content on a web page or web site; such a system may be used, for example, to update and present text, images, video, or linked information to a viewer of an eCommerce website. In some embodiments, the CMS system enables a user to remotely control the content presented on a web page using a relatively simple control structure based on a "Base" administration page and a separate "Satellite" function or process responsible for rendering the content on a website. These two components or processes (the Base and Satellite) may communicate using a specific communications protocol and/or set of instructions or commands. The Satellite function provides a set of APIs for a "Host" application to use in order to access content for presentation on the website.

An example of one possible use case or implementation environment for an embodiment of the inventive system and methods is that of a multi-tenant system or data processing platform. This setting provides a useful example as such platforms store and process relatively large amounts of data for operating companies who are tenants of the platform. Users (either tenant employees or customers) may frequently desire to access content provided on one or more web pages provided by (or for) a tenant operating an eCommerce website or other form for delivering information to users.

Although the description of aspects of the inventive system and methods may reference an implementation as part of a multi-tenant system, it is important to note that an embodiment of the system and methods may be implemented as part of (or in conjunction with) almost any system that includes the ability to generate a web page or website. Such systems may include web servers, eCommerce platforms, video or audio streaming platforms, advertising platforms, on-line catalogs, etc.

A multi-tenant architecture provides a means for multiple accounts (tenants) and users to store and access their data, and to utilize specific applications that reside on a remote platform. The platform is typically implemented as a set of servers or server groups, and is administered and operated by another party that provides use of the platform infrastructure as a service to the accounts and each account's users. This service may provide data storage, computational processing power, data analytics, and applications or workflows that may be executed with reference to an account's data (in whole or in part, and account-wide or user-specific).

In some cases, such services have been described as Software-as-a-Service (SaaS), cloud-based services, web-services, or remote services.

The applications that reside on a platform may be used to process certain of a user's data by instantiating an occurrence of the application within the user's account; for these types of uses, the applications may include ones utilized to operate a business, such as ERP, CRM, eCommerce, and financial applications. Tenant customizations to the operation of the architecture may include custom functionality (such as the capability to perform tenant or user-specific functions, workflows, data processing, or operations) built on top of lower level operating system functions.

Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in some embodiments, aspects of the invention may be implemented in the context of a multi-tenant, "cloud" based environment (such as a multi-tenant business data processing platform), typically used to develop and provide Internet/web-based services and business applications for end users. This exemplary implementation environment will be described with reference to FIGS. 1-3.

FIG. 1 is a diagram illustrating a system 100 in which an embodiment of the invention may be implemented. Enterprise network 104 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 104 is represented by an on-site local area network 106 to which a plurality of personal computers 108 are connected, each generally dedicated to a particular end user, such as a service agent or other employee (although such dedication is not required), along with an exemplary remote user computer 110 that can be, for example, a laptop computer or tablet computer of a traveling employee having internet access through a public Wi-Fi access point, or other internet access method. The end users (consumers) associated with computers 108 and 110 may possess an internet-enabled smartphone or other electronic device (such as a PDA, tablet, laptop computer) having wireless internet access or other synchronization capabilities. Users of the enterprise network 104 interface with the integrated business system 102 across the Internet 112 or another suitable communications network or combination of networks.

Integrated business system 102, which may be hosted by a dedicated third party, may include an integrated business server 114 and a web interface server 116, coupled as shown in FIG. 1. It is to be appreciated that either or both of the integrated business server 114 and the web interface server 116 may be implemented on one or more different hardware systems and components, even though represented as singular units in FIG. 1.

In a typical example in which system 102 is operated by a third party for the benefit of multiple account owners/tenants, each of whom is operating a business, integrated business server 114 comprises an ERP module 118 and further comprises a CRM module 120. In many cases, it will be desirable for the ERP module 118 to share methods, libraries, databases, subroutines, variables, etc., with CRM module 120, and indeed ERP module 118 may be intertwined with CRM module 120 into an integrated Business Data Processing Platform (which may be single tenant, but is typically multi-tenant).

The ERP module 118 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 120 may include, but is not limited to, a sales force automation (SFA) module, a marketing automation module, a contact list module (not shown), a call center support module, a web-based customer support module, a reporting and analysis module, and other CRM-related modules. The integrated business server 114 (or multi-tenant data processing platform) further may provide other business functionalities including a web store/eCommerce module 122, a partner and vendor management module 124, and an integrated reporting module 130. An SCM (supply chain management) module 126 and PLM (product lifecycle management) module 128 may also be provided. Web interface server 116 is configured and adapted to interface with the integrated business server 114 to provide one or more web-based user interfaces to end users of the enterprise network 104.

The integrated business system shown in FIG. 1 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

Figure 2:
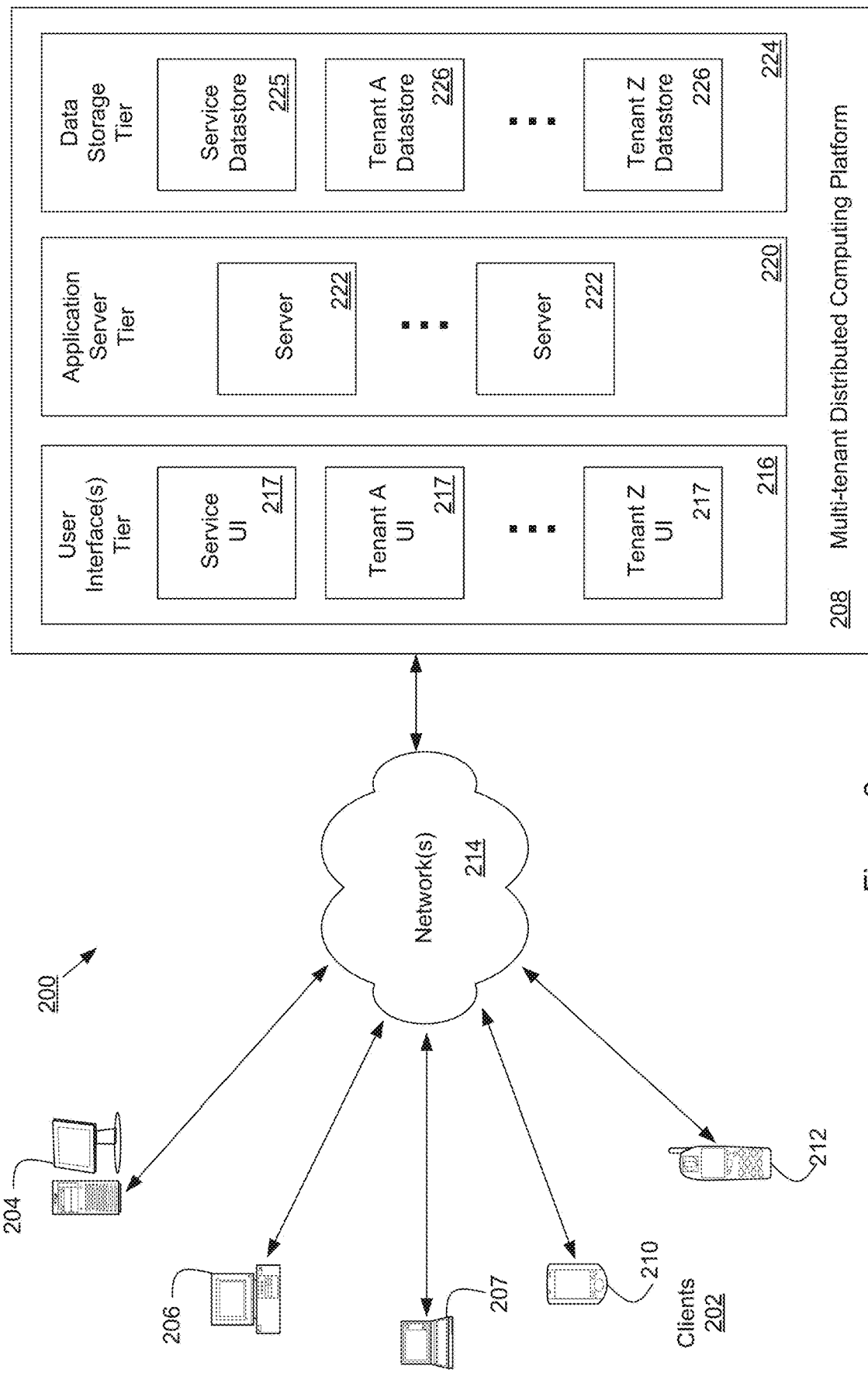
FIG. 2 is a diagram illustrating elements or components of an example operating environment in which an embodiment of the invention may be implemented.

FIG. 2 is a diagram illustrating elements or components of an example operating environment 200 in which an embodiment of the invention may be implemented. As shown, a variety of clients 202 incorporating and/or incorporated into a variety of computing devices may communicate with a distributed computing service/platform 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 207, notebook computers, tablet computers or personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing service/platform (which may also be referred to as a multi-tenant business data processing platform) 208 may include multiple processing tiers, including a user interface tier 216, an application server tier 220, and a data storage tier 224. The user interface tier 216 may maintain multiple user interfaces 217, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more Tenant Data stores 226.

Each tenant data store 226 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 208 may be multi-tenant and service platform 208 may be operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include (but are not required to include, nor limited to only including): accounting, order processing, time and billing, inventory management, retail point of sale (POS) systems, eCommerce, product information management (PIM), demand/material requirements planning (MRP), purchasing, content management systems (CMS), professional services automation (PSA), employee management/payroll, human resources management, and employee calendaring and collaboration, as well as reporting and analysis capabilities relating to these functions. Such functions or business applications are typically implemented by one or more modules of software code/instructions that are maintained on and executed by one or more servers 222 that are part of the platform's Application Server Tier 220.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system can include (but are not required to include, nor limited to only including): sales force automation (SFA), marketing automation, contact list, call center support, returns management authorization (RMA), loyalty program support, and web-based customer support, as well as reporting and analysis capabilities relating to these functions. In addition to ERP and CRM functions, a business information system/platform (such as element 208 of FIG. 2(A)) may also include one or more of an integrated partner and vendor management system, eCommerce system (e.g., a virtual storefront application or platform), product lifecycle management (PLM) system, Human Resources management system (which may include medical/dental insurance administration, payroll, etc.), or supply chain management (SCM) system. Such functions or business applications are typically implemented by one or more modules of software code/instructions that are maintained on and executed by one or more servers 222 that are part of the platform's Application Server Tier 220.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 208 of FIG. 2).

As noted with regards to FIG. 1, the integrated business system shown in FIG. 2 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet or a private "intranet" network.

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases such an extension may be applied to the processing of the tenant's business related data that is resident on the platform. The extension may be developed by the tenant or by a 3rd party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way, aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

Figure 3:
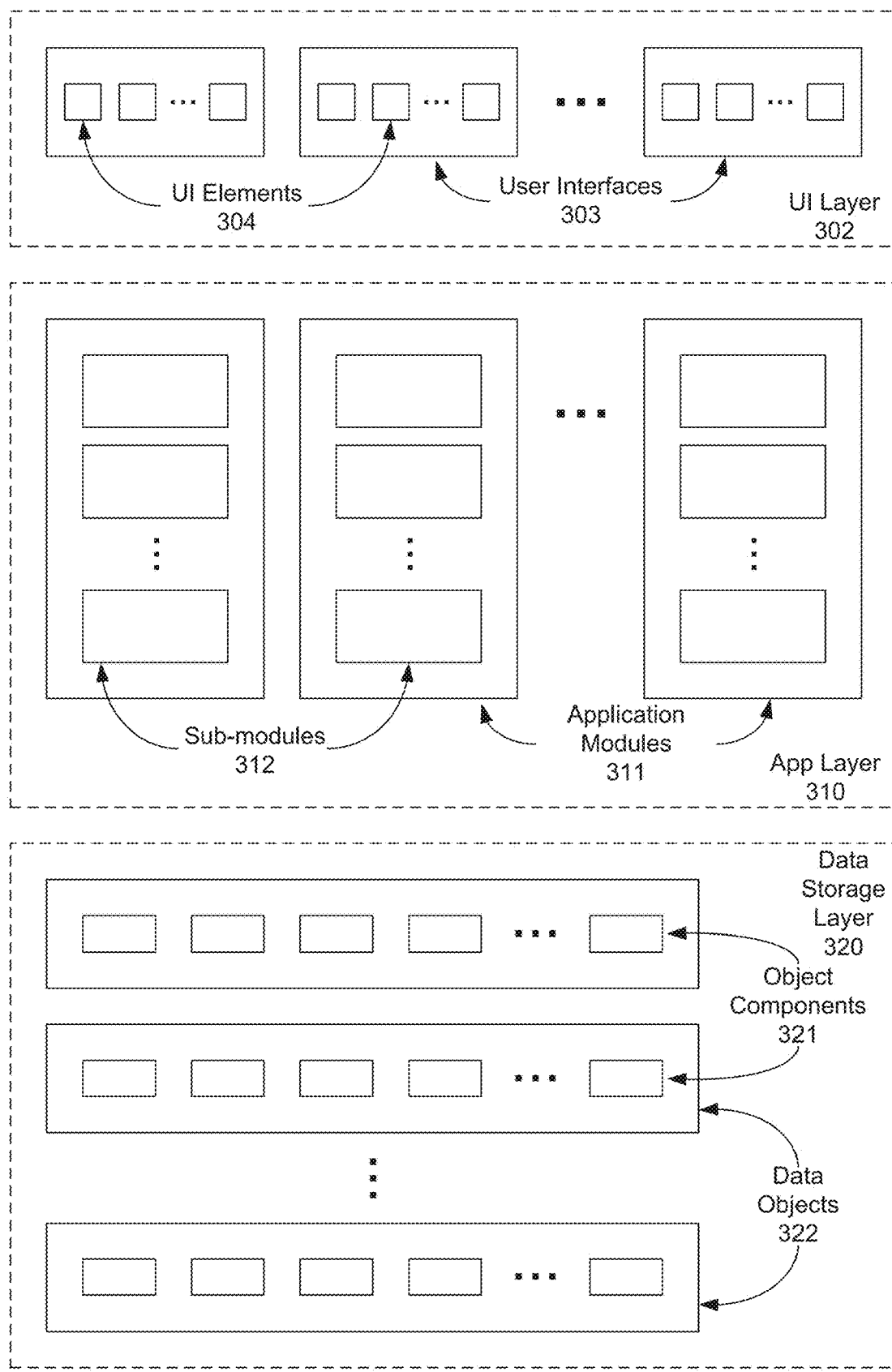
FIG. 3 is a diagram illustrating additional details of the elements or components of the multi-tenant distributed computing service platform of FIG. 2, in which an embodiment of the invention may be implemented.

FIG. 3 is a diagram illustrating additional details of the elements or components of the multi-tenant distributed computing service platform of FIG. 2, in which an embodiment of the invention may be implemented. The software architecture depicted in FIG. 2 represents an example of a complex software system to which an embodiment of the invention may be applied. In general, an embodiment of the invention may be implemented using a set of software instructions that are designed to be executed by a suitably programmed processing element (such as a CPU, microprocessor, processor, server, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 3 is a diagram illustrating additional details of the elements or components 300 of the multi-tenant distributed computing service platform of FIG. 2, in which an embodiment of the invention may be implemented. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer 310 may include one or more application modules 311, each having one or more sub-modules 312. Each application module 311 or sub-module 312 may correspond to a particular function, method, process, or operation that is implemented by the module or sub-module (e.g., a function or process related to providing ERP, CRM, eCommerce or other functionality to a user of the platform). Such function, method, process, or operation may also include those used to implement one or more aspects of the inventive system and methods, such as for:

generating a user interface that permits a user to perform one or more of the web page content operations or manipulations described herein;

interpreting the user's actions and executing one or more data processing or data presentation operations as needed to provide the user with a desired output, etc.);

implementing and executing the operations described herein with regards to the functions of the Base and Satellite components, including, but not limited to (or requiring) overlay control, resizing, and other aspects of how the user interface is displayed with reference to the contents of the web page;

implementing a communication protocol or capability between the Base and Satellite elements to permit the exchange of data and/or events between those components; or implementing a suitable application programming interface (API) to enable exchange of data and/or controls between the Satellite component and the Website (Host application).

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2) may include each application module. Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Although further examples below may reference the example computing environment depicted in FIGS. 1-3, it will be apparent to one of skill in the art that the examples may be adapted for alternate computing devices, systems, apparatuses, processes, and environments. Note that an embodiment of the inventive methods may be implemented in the form of an application, a sub-routine that is part of a larger application, a "plug-in", an extension to the functionality of a data processing system or platform, or any other suitable form.

In the following description, the terms below are meant to have at least the indicated meaning:

CMS Content aka "Content"—Content are distinct individual objects with specific placement criteria made up of an Area name, a sequence within that Area, and a context like a specific page or a page type. The properties of Content are edited using the inventive system (CMS). There are multiple types of Content (e.g. Text, Image, video, etc.), each with their own properties and HTML templates. When a web page with CMS Content loads, the Content are each rendered based on their templates and their property values, resulting in an HTML string that is injected into the page DOM. Each piece of Content rendered into the page DOM has a containing div with a class attribute "cms-content" and an id attribute that contains a unique identifier and begins "cms-content";

Area—all CMS Content on a web page is in a containing div called an Area. Areas can contain multiple pieces of Content and each page can contain multiple Areas. Areas are defined in the templates/HTML source code for the website, typically not managed by the user via the CMS UI. Each Area has a name defined by a data attribute, data-cms-area; and iFrame—an IFrame (Inline Frame) is an HTML document embedded inside another HTML document on a website. The IFrame HTML element may be used to insert content from another source, such as an advertisement, into a Web page.

Figure 4A:
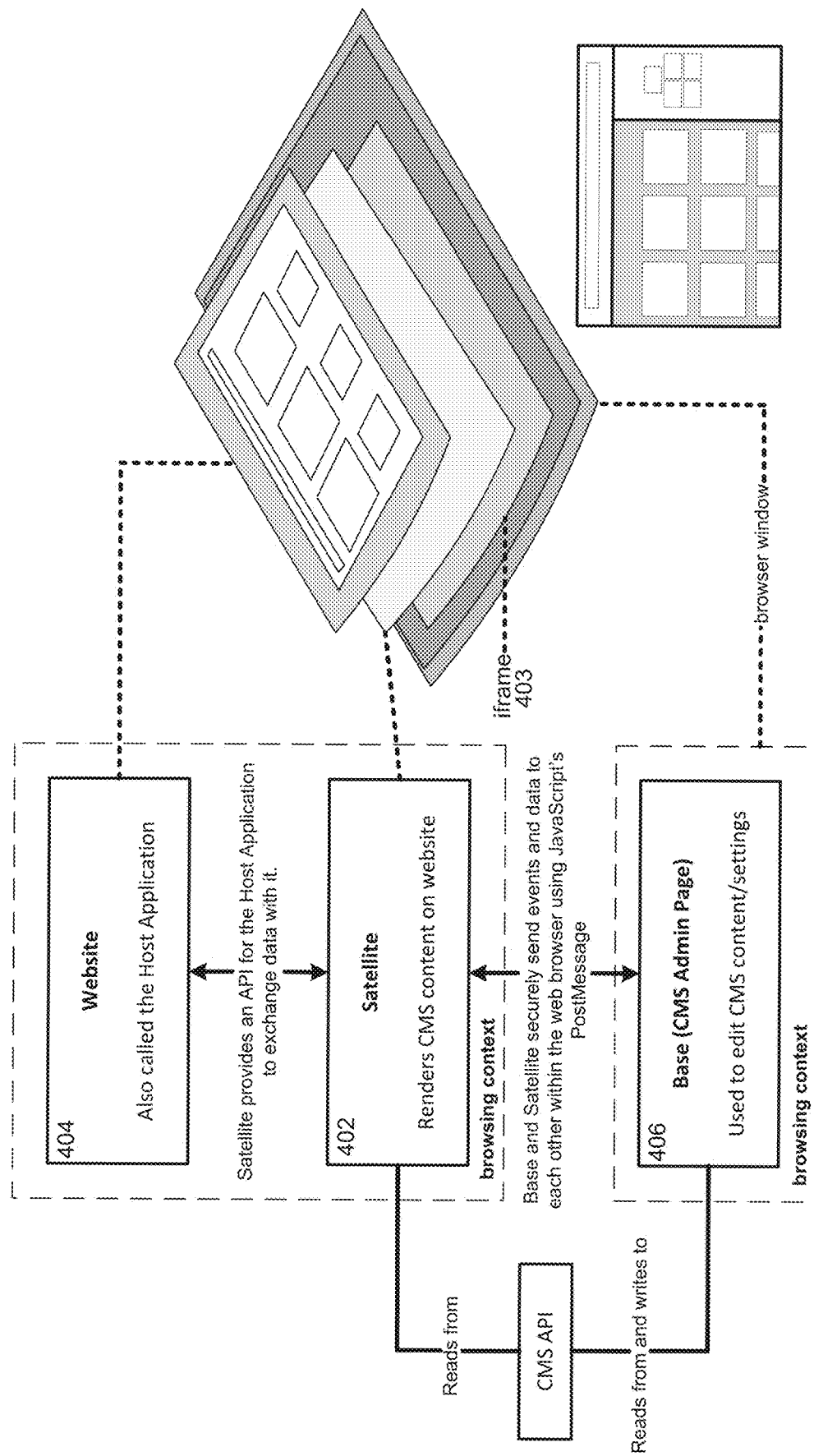

FIGS. 4(*a*) and 4(*b*) are diagrams illustrating aspects of the implementation of an embodiment of the inventive system and methods; FIG. 4(*a*) illustrates certain of the functional elements or components of the inventive architecture and the relationship between those elements or components, while FIG. 4(*b*) is a flow chart or flow diagram illustrating certain of the operations, functions, or processes that may be used as part of implementing an embodiment of the inventive system or architecture. More specifically, FIG. 4(*a*) illustrates the relationship between the Base, Satellite and Website (Host application) "layers", while FIG. 4(*b*) illustrates certain of the functions or operations performed by the Base and Satellite "layers" as they interact with the Website (Host application).

An example implementation of the inventive system or architecture has two primary complementary elements or functions that are executed independently of each other and that communicate with each other through a messaging system. A primary element, called "Base", is a single-page web application used by authenticated users to manage a website's content and settings. A second element, called "Satellite", is a program included on the website being managed (typically by using a script element) and that handles a variety of behind-the-scenes tasks, including (but not limited to, or necessarily requiring):

Rendering CMS Content (as that is defined below) on the web page;

Collecting data about the website and the current web page, and conveying it to Base; and Facilitating keeping the state of the website in sync with changes made by a user in Base.

The website being managed (which is referred to as the "Host Application" in some contexts) is loaded in an iframe element in Base. Loading the website in an iframe creates a nested browsing context, encapsulating the Host Application and Satellite. Note that in the illustration shown in FIG. 4(*a*), items (elements, content, components, functions, processes, data) in the iframe's browsing context are indicated by a "layer" 403 that is separate from the "layer" 406 containing items in the parent browsing context (i.e., Base). In some embodiments, the Satellite and Base components communicate with each other across the barrier of separate browsing contexts using the JavaScript window.postMessage method or mechanism/protocol (although another suitable method or communications protocol may be used).

FIG. 4(*b*) is a flow chart or flow diagram illustrating certain of the operations, functions, or processes that may be used as part of implementing an embodiment of the inventive system; specifically, the figure illustrates certain of the functions or operations performed by the Base and Satellite "layers" as they interact with the Website (Host application). The diagram illustrates the processes that may be triggered by different specific events or criteria being met during use of the inventive system. One goal or purpose of the inventive system is to keep what is displayed in the Overlay in sync with the website displayed inside the iframe by showing the correct Overlay elements that correspond to the page contents, and positioning them precisely in the Overlay corresponding to the layout of the web page beneath. For the most effective user experience, it is desirable to create the illusion that the Overlay is not actually a totally separate object from the page beneath it, but that they are connected.

Returning to FIG. 4(*a*), in the Figure, Satellite 402 is illustrated (but would typically not be rendered visually to a user) as a layer positioned between the iframe element 403 and the website 404. This is done to illustrate how Satellite 402, the Host Application 404, and Base 406 interact with one another. Satellite 402 is loaded on the website in the same manner as any other JavaScript file that the site relies on, but it is not a part of the Host Application 404 (at least in the scenario illustrated). Note that embodiments of the inventive system and methods do not require that Satellite 402 and the Host Application 404 be separate entities; the functions fulfilled by Satellite 402 may be directly implemented by the Host Application 404 if the modularity achieved by separating them is not necessary or desired for a particular implementation.

Base 406 functions or operates to display the website in an iframe and also displays a user interface (UI) that may be used for managing content, configuring settings, arranging the display of eCommerce webpage data, etc. A user may interact with the website within the iframe, navigate to other pages, scroll, etc., without causing the browser to navigate away from Base 406. When a user navigates to the Base page in their web browser, Base 406 initializes, verifies the user's authentication, and performs or configures the following operations or actions:

1. Starts listening for messages from Satellite through postMessage protocol;
2. Loads the website in the iframe (i.e., sets the element's src property to the website URL);
3. Receives a "sat-ready" message from Satellite, signifying that the loading and configuration of the Host Application and Satellite are complete; and
4. Displays/enables UI so the user may begin.

Note that the preceding description focuses primarily on the "loading" steps that are performed to implement certain of the novel aspects of the inventive system and methods. The description therefore does not include certain of the steps that a real-world single-page web application might do to initialize and load its content. This is because the overall process depends on aspects of a particular product's architecture and functional requirements that are not directly dependent on the inventive system or methods. An example implementation of the Base application may utilize a JavaScript library such as Backbone.js or a JavaScript framework to assist in determining the architecture and, ultimately, creating data structures, views, setting up the DOM, setting up an event system, etc., when Base loads.

As the user interacts with the user interface in Base to edit content, change the settings of pages, or perform other tasks that affect the website, Base regularly sends information to Satellite about the user's actions so that the display of the website can be updated to reflect the changes being made. For example, if the user clicks a button to delete a piece of Content from a page, Base might send a message instructing Satellite to remove that Content from the web page's DOM (document object model). Or, if the user begins adding a new page, Base sends a message to Satellite with the new page's settings so that Satellite can notify the Host Application to add the new page to its internal store of pages and then be able to navigate to it. While Satellite facilitates keeping the in-memory, client-side state of the website up-to-date, Base handles submitting the user's changes to the CMS (content management system) API to be persisted.

Note that there are at least two elements or components of the inventive system and methods that operate to perform functions that are not found in conventional content management systems; these are Frame Overlay and Frame Positioning. The Frame Overlay positions UI elements in Base precisely over (or near) the elements on the web page that they affect, relate to, or to which they correspond. Frame Positioning involves sizing and moving the iframe within Base to adapt to various UI layouts and make room for the effective display of other UI elements.

Frame Overlay

The Frame Overlay exists in Base's DOM, outside of the iframe's browsing context. In terms of DOM structure and styling, at a high level, Frame Overlay consists of:

An outer div element aligned to the edges of the iframe and stacked atop it on the z-axis;
One or more inner div elements whose descendants will scroll in sync with the iframe scrolling;
One or more inner div elements whose descendants won't scroll with the iframe scroll; and
Overlay UI elements as descendants of the inner div elements.

To keep the Overlay aligned with the iframe element, both are placed inside a containing div element (referred to as the Frame Container) and are positioned using CSS (cascading style sheet(s)) to fill its entire width and height. By using this technique, the size and position of the Frame Container determine the size and position of both the iframe and the Overlay; and, the Overlay stays aligned with the iframe. An example of an implementation of this technique is the section of code illustrated in FIG. 4(*c*).

One of the uses/purposes of the Overlay is to show outlines around each piece of CMS Content and each "Area" on the web page. These are termed "Overlay Outlines". Overlay Outlines for Content contain buttons to edit and delete that Content. Outlines for Content could also display information about the Content, such as an indicator that there are changes to the Content that have not yet been published to the live site, or the name of the user who created the Content, or who was last to edit it.

Overlay Outlines for Areas primarily display information about the Area, such as whether the Area's Content will be displayed only on the current page, displayed on all pages, or displayed on any page of the same type. Outlines for Areas could also contain buttons to add new Content to the Area, to activate a mode for changing the sort order of the Content in the Area, or to perform another action related to the Area.

Note however that Overlay Outlines are not limited to being used only for Areas and Content; examples of other uses may include (but are not limited to):

Suppose a site's HTML code declares an image element in the page header to display the site's logo, and that the path to the logo image is determined by a configuration option that can ordinarily be changed using a site settings form in Base. This is different from CMS Content because it is just a simple DOM element defined in the template, not editable Content added to an Area using the CMS admin. An Outline could be created for the logo element and could contain a button that enables the user to set the logo image path (e.g., by displaying a UI for uploading a new image, or by automatically navigating to the site settings form and highlighting the logo path field); and/or Although displaying a grid of products on an eCommerce category page could be accomplished by adding CMS Content to the page (using a Content type that is capable of rendering a list/grid of products), it is typically accomplished by the Host Application processing a data structure containing the items that belong in the category using a templating engine, in order to dynamically generate the grid HTML code to add to the DOM. In this case, it may still be useful for the grid to have an Overlay Outline; the Outline could contain a button to activate a mode for adding or removing products from the category.

Area Outlines and Content Outlines are styled to look different from each other to improve the user experience, but multiple kinds of Outlines could share the same styling. Most often, an Overlay Outline would be styled to have some kind of visible border, but it is not required. It may be desirable for some Outline types, for instance, to function as a container for positioning buttons over or near the Outline's underlying element on a web page.

Figure 4B:
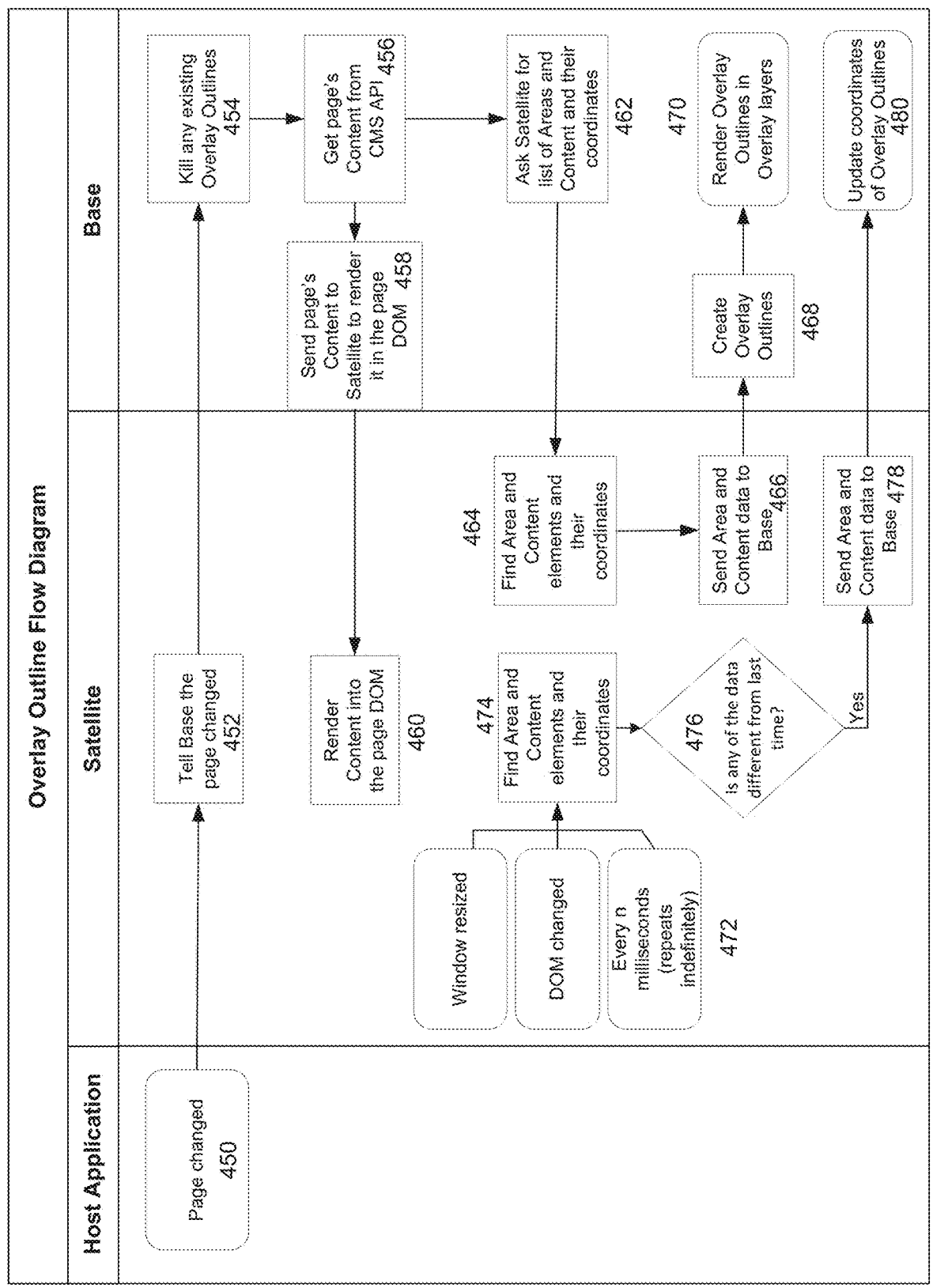

FIG. 4(b) is a flow chart or flow diagram illustrating certain of the operations, functions, or processes that may be used as part of implementing an embodiment of the inventive system. Before describing the figure in further detail, a list of the assumptions that have been made before the control flows to the "Page Changed" stage or step (450) in the diagram is provided; these assumptions include the following:

the Base web page has been navigated to in a web browser and Base has finished loading; and Base and Satellite have finished an initial execution of the processes to be described that begin at Page changed (stage or step 450), excluding Tell Base the page changed (stage or step 452), and Kill any existing Overlay Outlines (stage or step 454); this is done when Base first loads.

FIG. 4(b) represents the processes that may be triggered by different specific events or criteria being met. One goal or purpose is to keep what is displayed in the Overlay in sync with the website displayed inside the iframe by showing the correct Overlay elements that correspond to the page contents, and positioning them in the Overlay corresponding to the layout of the web page beneath. For the most effective user experience, it is desirable to create the illusion that the Overlay is not actually a separate object from the page beneath it, but that they are connected.

The following describe aspects of the processes, operations, or functionality identified in the figure:

Page changed (450)

Host Application notifies Satellite (e.g., via an event system) that it has been navigated to a different page;

Tell Base the page changed (452)

Satellite sends a message to Base to convey the page change; the message or messages include data and/or metadata about the page, such as the URL or path, the type of page (e.g. landing page, product detail page, etc.);

Kill any existing Overlay Outlines (454)

Base removes the elements from the Overlay that were created for the previous page;

Get page's Content from CMS API (456), Send page's Content to Satellite to render it in the page DOM (458), Render Content into the page DOM (460)

The new page's content needs to be rendered on the web page for the Content Outlines to be created for the Overlay. Note that the exact steps are not essential to the Overlay processes, but rather illustrate a possible implementation. There are other ways for this to be accomplished, including Satellite getting the content from the API and rendering it without involvement from Base, or the Host Application handling the rendering itself. For other processes unrelated to the Overlay, Base needs the content data from the API, so it is efficient for it to be retrieved once by Base, and then provided to Satellite for rendering. In terms of creating the Overlay Outlines, it is important that the new page's content be rendered in the DOM;

Ask Satellite for list of Areas and Content and their coordinates (462)

At this point, Base knows what Content should be on the page based on the data retrieved from the API, but it does not know what Areas are on the page because those are determined by the contents of the site's HTML code/templates. It also does not have any knowledge of where on the page (spatially) pieces of Content and Areas are, or their dimensions, which are necessary to be able to accurately position the Overlay Outlines;

Find Area and Content elements and their coordinates (464)

Satellite will generate an array of Area objects (referred to herein as areas_and_content). The objects will have properties for the Area's name, its coordinates on the page, and an array of Content objects for its Content children. The Content objects will have properties for a unique identifier and the Content's coordinates.

Satellite needs to find every element in the DOM that is Content or an Area. Since Content are children of Areas, one way to accomplish this is by finding all of the Areas first, then looking for Content within those elements. Areas have a data-cms-area attribute, which can be used to get a reference to each Area element. This is straightforward using a library like jQuery (var areas=$("[data-cms-area]"). Assuming Areas only change when the page changes, this can be made more efficient by caching the result and purging the cache on a page change. Additionally, Satellite may cache the result of this step (the array of Areas) to enable it to compare new data to previous values.

Satellite iterates over the found Area elements. It adds a new object to areas_and_content for each Area. It also collects data about its position on the page and uses the data to calculate a set of coordinates. These coordinates will be used by Base to position the Overlay Outline for this element.

The coordinate(s) data includes an object's width and height; the position of its top, right, bottom, and left edges relative to the top-left corner of the page; and its vertical and horizontal centers relative to the top-left corner of the page. The coordinate values may be expressed as pixel lengths. Satellite uses the getBoundingClientRect method on each DOM element object to get the basic coordinates data, but those values are relative to the top-left of the viewport, not to the page. It also does not include all of the data needed by Base. To calculate the values relative to the page instead of the viewport, the current scroll position is added to the values, such as by implementing the example section of code illustrated in FIG. 4(d).

Because web browsers perform sub-pixel rendering, these values are often not whole numbers; that may cause Overlay elements to jump or jitter during scrolling or other animations due to rounding inconsistencies, especially when the iframe has been scaled down. In some embodiments of the inventive system and methods, the following process is implemented in order to reduce this behavior; if the Area/

Content exists in the cache of areas_and_content from the previous time this process was done, then the value of each property is compared to the cached value. If the difference between the two values is less than one pixel, then the new value is replaced with the cached value; however, if the difference is greater than one pixel, then the new value is rounded to the nearest half pixel.

Satellite checks if the Area has any Content by searching its children for elements with the class "cms-content", adds a new object for each Content to the Area's content array, and calculates the coordinates of each Content using the same method used for Areas. Satellite then sends the data (areas_and_content) to Base using the implemented message or data protocol(s) (stage or step 466);

Create Overlay Outlines (468)
  For every Area and Content found in the data provided by Satellite, Base creates Outline elements containing the appropriate UI elements for each type (Area, Content, etc.). The CSS for Outlines makes them positioned and Base sets each Outline's top, left, width, and height style properties based on the coordinates data;

Render Overlay Outlines in Overlay layers (470)
  Base adds the newly created Outlines into the DOM in the Overlay element. Each type of Overlay Outline is added to a different containing div (one container for Content Outlines, another for Area Outlines, etc.). These containers are termed "Overlay Layers". This makes it easier to hide and show all of one type and efficiently replace all of one type of Outline with new ones. The Areas layer is not usually visible until the user clicks a button to add content to the page. The Content layer and the Areas layer are both children of the container mentioned earlier that stays in sync with the scroll position of the iframe browsing context;

Window resized, DOM changed, every n milliseconds (472)
  Base loading and the page changing are not the only times this process is used; there are other conditions that can cause changes to the layout of the page, and some occur regularly, such as:
    An animated slideshow on the page causing the position of other elements to shift periodically;
    The user resizing the window; or
    The user adding, removing, or editing Content on the page.

The position of elements in the Overlay is updated any time the position of elements on the page changes; otherwise, the Overlay Outlines will not be aligned to the elements they correspond to on the page and the Overlay will appear out of sync. On the other hand, it is preferable that Overlay positions not be updated too often (or unnecessarily) because it is a relatively slow process and doing so would have a negative impact on performance.

The inventive system uses a combination of approaches to ensure Overlay positions stay in sync with the page without causing performance issues. For example, Satellite regularly (and automatically) sends updated coordinates data to Base, so Base does not need to request updated data (although it still can and may at times).

When Base first loads, Satellite sets up a process or processes to detect changes in the page's layout (such as those suggested by step or stage 472). The first such process is triggered by changes to the DOM; Satellite instantiates a mutation observer for the html element and uses the mutation observer callback to start the process for sending updated data to Base. A second such process is triggered whenever the window is resized. Window resize events are usually fired very rapidly (hundreds of times a second while the window is being resized); Satellite debounces (limits the rate at which the function will execute) the handler for this listener, so that it will only respond when the window stops being resized. Note that other throttling techniques can be used instead of (or in conjunction with) debouncing. Since this listener is in the iframe's browsing context, it will be triggered any time the width of height of the iframe element changes.

Another such process is a fallback that is executed repeatedly at a regular interval (e.g., one second). If any change in positioning is not caught by the mutation observer or window resize listener, then the updated coordinates will be sent to Base the next time the fallback process runs. Whenever any of these processes is triggered, Satellite determines the area content elements and their coordinates (stage or step 474, and typically as performed in stage or step 464), compares the new Area/Content data to the previous, cached data (stage or step 476) and only sends the data to Base if something has actually changed (stage or step 478). This process also differs from what is done on page changed in that it may update the position of existing Overlay Outlines (stage or step 480) or add and remove some Overlay Outlines, rather than killing and re-creating all of the Overlay Outlines. Note that if desired, the Overlay Outlines may all be killed and re-created to improve performance or to simplify the code.

Overlay Scrolling
  To keep the Overlay contents properly aligned with the web page when the iframe is scrolled, Satellite listens for scroll events. When the scroll listener is triggered, Satellite gets the current scroll position and sends it to Base; Base then shifts the position of the Overlay scrolling container using CSS transforms (or, alternatively, CSS positioning) to offset it to the current scroll position of the iframe. Note that to improve performance and ensure that the Overlay scroll synchronization happens in smooth motion, Base may listen directly for scroll events on the iframe, bypassing Satellite.

Frame Positioning
  By default, the iframe fills most of the browser viewport. This provides a preview of the website that's representative of what a visitor to the site (not using Base) would see with their browser window set to the same size as that of the user of Base. Per the usual behavior of web browsers, if the website visitor or Base user were to resize their browser window to make it narrower or wider, then the layout of the web page would change to adjust to the new width of the viewport. For a web page within an iframe, the width of the iframe element is analogous to the width of the browser window. Changing the iframe's width to make it smaller would alter the layout of the page in the iframe. Frame Positioning, as used herein, is a way to scale and position the iframe without requiring its actual width to change from its initial width. Frame Positioning also enables placing the iframe into different UI layouts in Base without moving the actual iframe element into the element structure that makes up the layout. This is important because moving the iframe to a different position in the DOM (i.e., to a different parent node) will usually cause the iframe page to reload, breaking communication between Base and Satellite until Satellite loads again in the iframe.

DOM and Styling Setup for Frame Positioning
  Frame Positioning relies on the Frame Container described in the Overlay information presented previously. The Frame Container and its children, the iframe and the Overlay, collectively are termed the "Frame". The Frame is a child of a div that is styled to fill the viewport (minus any space at the top used for Base's main toolbar). That element is referred to herein as the "Well". In general, other UI layouts and elements would also be added to the Well element. In an example of Base's DOM there might be the following elements or aspects:

- a main toolbar at the top of the page (not required, but likely for most applications);
- the Well element, styled to fill the width of the viewport and the remaining vertical space of the viewport available below the toolbar;
- the Frame Container as a child of the Well, positioned to fill the Well by setting its "top", "right", "bottom", and "left" CSS properties to "0";
- the iframe as a child of the Frame Container, with "width" and "height" CSS properties set to "100%"; and
- the Overlay element as a child of the Frame Container, positioned to fill the Frame Container by setting its "top", "right", "bottom", and "left" CSS properties to "0".

An example section of code that may be used to implement this aspect is illustrated in FIG. 4(e).

Note that for the sake of keeping the code example shown in FIG. 4(e) focused on details that are most relevant for a functioning implementation of the Frame Positioning function, an example CSS for the Well isn't shown; this is primarily because the approach used is not expected to make a difference as long as the result is as described in the list above. There are multiple ways that its styling could be implemented; for example, one approach would be to use the CSS flexible box model with the toolbar and Well inside a wrapper flex container div (flex-direction: column), with flex-grow set to 0 on the toolbar and 1 on the Well.

Preferably, the Base page should be styled so that the contents are not taller than the viewport to prevent scrolling of the window. To allow for scrolling in Base's UI, individual lower-level UI containers within the Well may be styled to enable scrolling when their content overflows.

Positioning and Scaling the Frame

The default position of the Frame is one in which its four edges are aligned to the four edges of the Well. Throughout the Frame positioning process, the actual width of the iframe element should remain the same as its width in this default position so that the layout of the web page is not affected by scaling the Frame. The iframe will become smaller, but only through visually scaling it down, not by changing its actual width.

In some embodiments, there are four parameters used to position the iframe: width, height, x, and y. The values of the width and height parameters determine the pixel dimensions of the Frame. The x and y parameters determine how many pixels the Frame is offset from its default position horizontally and vertically, respectively (note that the values of x and y may be positive or negative).

To position the Frame, the styles of both Frame Container element and the iframe element may be modified using JavaScript to apply CSS via the "style" property of each element. The following describes the procedure in terms of the multiple steps that are required, but in practice they may not be sequential—preferably, in some embodiments, these styling modifications should happen simultaneously.

As noted, the width of the iframe element preferably remains static. To keep the iframe's width consistent, Base sets the "width" CSS property of the iframe element to the current width of the Well element. In some embodiments, the style modifications to the Frame Container are as follows:

- its "width" CSS property is set to the value of the width parameter;
- its "height" CSS property is set to the value of the height parameter; and
- its position is offset by the x/y values using CSS transform to "translate" the element. CSS transforms result in better performance than trying to adjust the actual layout position using the "top" and "left" CSS properties.

A next step is to scale the iframe using CSS transform to visually match the new width of the Frame Container. To do this, the scale ratio is calculated by dividing the new Frame width by the width of the Well. For example, if the Well is 1200 pixels wide and the Frame should be scaled to 900 pixels wide, then the scale ratio would be 0.75 (900÷1200). The ratio can be used in the value of the CSS "transform" property to scale the iframe element.

Since scaling with CSS transform changes the size of the iframe element in the CSS coordinate space without affecting its layout width or height, the iframe is scaled down proportionally without disrupting the layout of the web page in the iframe; that is, the iframe visually matches the new width of the Frame. Because the iframe's actual height is still 100% of the height of the Frame Container, it is visually too short to fill the Frame Container vertically now that the iframe element is scaled down. To address this, the height of the iframe element may be increased to compensate for the scaling so that it again extends to the bottom edge of the Frame Container. To find the height value needed to accomplish this, the inverse of the scale ratio is calculated; an example of code that may be used to implement this operation is shown in FIG. 4(f). The "height" CSS property of the iframe element is set to a percentage derived from multiplying the inverse of the scale ratio by 100.

As a result, with one or more of the described styling modifications applied to the Frame Container and the iframe, the Frame is proportionally scaled to the correct size without changing the layout of the web page in the iframe; it is also positioned at the correct x/y coordinates to appear as part of the Base UI layout.

Frame Positioning Animation

When Frame Positioning is performed, the CSS changes should preferably be animated in synchronization with one another so that the Frame transitions smoothly from its starting position and scale to its new position and scale.

Overlay Scaling

When the Frame is scaled during positioning, the positions of Overlay Outlines should preferably be adjusted to account for the new scale of the Frame in order to remain aligned properly to their underlying elements within the iframe. To achieve this, Base multiplies each Outline's top, left, width, and height values by the Frame's scale and updates the respective CSS properties of the Outline element with the new scaled values. The Outlines will be aligned and sized properly; note that they are not scaled using CSS transform, as otherwise any UI elements in the Outlines would appear too small relative to the rest of the CMS admin UI. Because this step often involves a significant amount of DOM manipulation (which can negatively affect the performance and smoothness of the Frame positioning animation), Base may wait to update the Overlay until after the Frame has finished transitioning. If so, Overlay Outlines should be hidden during the Frame transition to avoid displaying misaligned Outlines.

Note that the inventive website architecture and related functionality alters and replaces the conventional approach to building an in-context content management system.

Instead of loading the entire CMS application and all of its UI on the website being managed (as in a conventional approach), the inventive CMS is primarily part of its own dedicated web page and the website is included in the CMS page by loading it in an iframe element. A small amount of CMS code that is separate from the main CMS application is loaded on the website for displaying content to visitors and for modifying the website in response to user actions in the CMS application. To distinguish between the main CMS application and the CMS code loaded on the website, the main application is referred to as "Base" and the code on the website is referred to as "Satellite."

The Base element is able to resize and position the iframe to make room for other UI elements and support any UI layout. Base includes a frame overlay which overlays UI elements on top of the iframe and aligns them with elements on the page within the iframe. The overlay exists to support contextual UI elements, such as outlines of pieces of content, buttons to edit specific pieces of content, drag and drop capabilities, etc. When a user initiates some action through the UI in Base that requires something to change on the website, Base sends a message to Satellite using JavaScript (or another suitable communications language or format) with instructions for how to modify the page. For example, if a user clicks a button to delete a piece of content, then Base sends a message to Satellite to remove that content from the DOM. Base would also delete that content from the site's back-end data. Satellite gathers data and measurements about the web page that Base needs in order to render the overlaid editing tools, know what page is currently being viewed, and when the page changes, etc. Satellite sends this data to Base using the same method that Base sends messages to Satellite.

Since the iframe constitutes a separate "browsing context" from the CMS parent page, the website and its code are encapsulated within the iframe. The risk of code conflicts between Satellite and the website are minimal because Satellite is simple enough that it can be written with few or no JavaScript libraries and requires no UI elements or CSS for UI.

By containing the website within an iframe element, this approach also allows for the website to be resized and moved around on the CMS application page without changing the layout or appearance of the site. So, while the user is editing a piece of content, the iframe could become narrower to make room for a form panel beside it to display the settings for the content. Preferably, none of the website (or as little as possible without covering aspects that may be of interest to a user) should be covered by the editing UI to enable the user to obtain a preview of the changes being made. This also provides the flexibility to utilize UI conventions that are not possible with an in-context CMS that lacks the inventive aspects, as well as the opportunity to create new UI conventions and patterns that are tailored to in-context content management. Examples of such conventions and patterns, include, but are not limited to:

- the iframe can be reduced down to thumbnail size and a list of multiple thumbnail-sized pages shown (e.g., a list of pages on the website);
- it is possible to display multiple iframes side-by-side to compare different pages or different versions of the same page; and
- it is possible to resize the iframe to preview the site at different screen sizes. This could be for mobile device screen sizes, but can also be used to preview screen sizes bigger than the display of the device being used; for example, someone using a small tablet could preview the site at laptop and desktop screen sizes.

Figure 5:
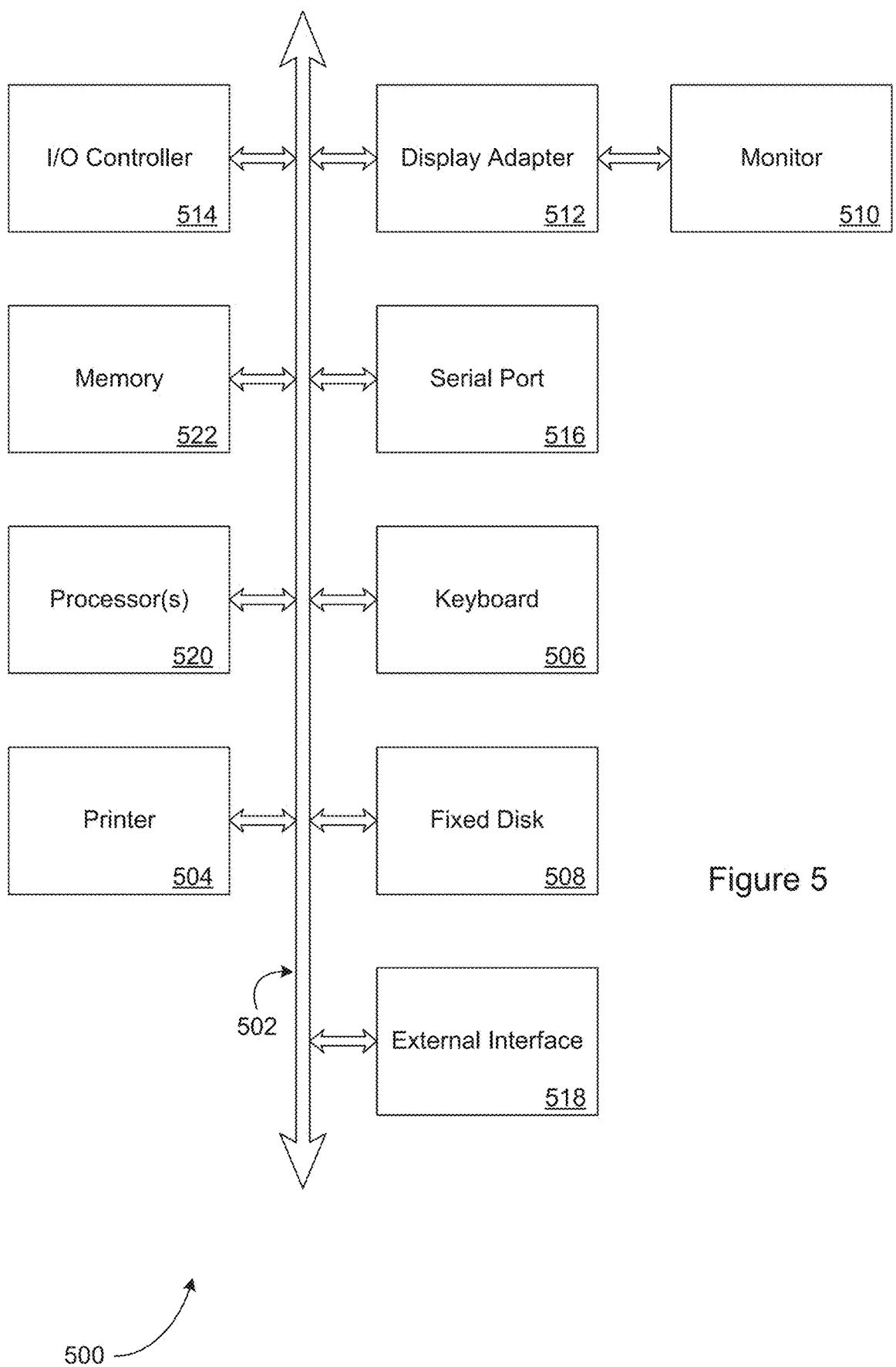
FIG. 5 is a diagram illustrating elements or components that may be present in a computer device or system configured to implement a method, process, function, or operation in accordance with an embodiment of the invention.

In accordance with one embodiment of the invention, the system, apparatus, methods, processes, functions, and/or operations for more efficiently managing content may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 5 is a diagram illustrating elements or components that may be present in a computer device or system 500 configured to implement a method, process, function, or operation in accordance with an embodiment of the invention. The subsystems shown in FIG. 5 are interconnected via a system bus 502. Additional subsystems include a printer 504, a keyboard 506, a fixed disk 508, and a monitor 510, which is coupled to a display adapter 512. Peripherals and input/output (I/O) devices, which couple to an I/O controller 514, can be connected to the computer system by any number of means known in the art, such as a serial port 516. For example, the serial port 516 or an external interface 518 can be utilized to connect the computer device 500 to further devices and/or systems not shown in FIG. 5 including a wide area network such as the Internet, a mouse input device, and/or a scanner. The interconnection via the system bus 502 allows one or more processors 520 to communicate with each subsystem and to control the execution of instructions that may be stored in a system memory 522 and/or the fixed disk 508, as well as the exchange of information between subsystems. The system memory 522 and/or the fixed disk 508 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random-access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method for providing a web page content management tool for managing web page content, the method comprising:

enabling a user to navigate to a website having at least one web page, wherein the website is operatively connected to a satellite application programming interface such that the satellite application programming interface collects information about the at least one web page and renders content on the at least one web page;

operating a rendering engine configured to render content associated with the at least one web page in a re-sizable iframe embedded in a base web application accessible from the website, wherein the base web application is operatively connected to the satellite application programming interface such that the satellite application programming interface forwards the information about the at least one web page to the base web application;

wherein the at least one web page and the satellite application programming interface are embedded in the iframe by the base web application such that the base web application, the satellite application programming interface, and the iframe are used to render content from the base web application on the at least one web page in the iframe;

providing a user interface which is operatively connected to the base web application such that the base web application provides an overlay on the user interface based upon the information about the at least one web page, wherein the overlay is configured to provide the user with an ability to modify the content associated with the at least one web page through manual interaction with the overlay by the user, wherein a size of the iframe is dynamically adjusted by the base web application in response to a manual size adjustment of the overlay by the user such that the iframe and the overlay are concurrently displayed on a display on the user interface at the same time in different areas of the display;

wherein the user interface and the base web application exchange a message regarding the modification in the content associated with the at least one web page in response to the manual interaction with the overlay by the user such that the message is further dynamically exchanged between the base web application and the at least one web page via the satellite application programming interface in order to render the modification in the content on the at least one web page by the satellite application programming interface; and modifying the content associated with the at least one selected web page in response to the message.

2. The method of claim 1, wherein the iframe is scaled within the base web application to resize the iframe within the base web application in response to an input provided by the user to the user interface.

3. The method of claim 1, wherein the iframe is repositioned within the base web application in response to an input provided by the user to the user interface.

4. The method of claim 1, wherein the iframe assists the user in adding, removing, or prepositioning an element of content associated with the at least one web page.

5. The method of claim 1, wherein the user, through the user interface, generates a message or messages regarding an event or data in response to one or more of the user resizing the at least one web page, the user repositioning an element of content on the at least one web page, the user adding an element of content to the at least one web page or the user removing an element of content from the at least one web page.

6. The method of claim 5, wherein the generated message is a JavaScript post message.

7. A non-transitory computer readable medium containing a set of instructions, which when executed by one or more programmed electronic processing elements cause the one or more processing elements to carry out a method for managing web page content, wherein the instructions comprise instructions configured for:

enabling a user to navigate to a website having at least one web page, wherein the website is operatively connected to a satellite application programming interface such that the satellite application programming interface collects information about the at least one web page and renders content on the at least one web page;

operating a rendering engine configured to render content associated with the at least one web page in a re-sizable iframe embedded in a base web application accessible from the website, wherein the base web application is operatively connected to the satellite application programming interface such that the satellite application programming interface forwards the information about the at least one web page to the base web application;

wherein the at least one web page and the satellite application programming interface are embedded in the iframe by the base web application such that the base web application, the satellite application programming interface, and the iframe are used to render content from the base web application on the at least one web page in the iframe;

providing a user interface which is operatively connected to the base web application such that the base web application provides an overlay on the user interface based upon the information about the at least one web page, wherein the overlay is configured to provide the user with an ability to modify the content associated with the at least one web page through manual interaction with the overlay by the user, wherein a size of the iframe is dynamically adjusted by the base web application in response to a manual size adjustment of the overlay by the user such that the iframe and the overlay are concurrently displayed on a display on the user interface at the same time in different areas of the display, and wherein the user interface and the base web application exchange a message regarding the modification in the content associated with the at least one web page in response to the manual interaction with the overlay by the user such that the message is further dynamically exchanged between the base web application and the at least one web page via the satellite application programming interface in order to render the modification in the content on the at least one web page by the satellite application programming interface; and modifying the content associated with the at least one web page in response to the message.

8. The non-transitory computer readable medium of claim 7, wherein the iframe is scaled within the base web application to resize the iframe within the base web application in response to an input provided by the user to the user interface.

9. The non-transitory computer readable medium of claim 7, wherein the iframe is repositioned within the base web application in response to an input provided by the user to the user interface.

10. The non-transitory computer readable medium of claim 7, wherein the user interface provides the user with the ability to add, remove, or reposition an element of content associated with the at least one web page.

11. The non-transitory computer readable medium of claim 7, wherein the user, through the user interface, generates a message or messages regarding an event or data in response to one or more of the user resizing the at least one web page, the user repositioning an element of content on the at least one web page, the user adding an element of content to the at least one web page or the user removing an element of content from the at least one web page.

12. A system for providing a web page content management tool for managing content within a web page, comprising:

a processor; and a web page content management tool, wherein the web page content management tool includes instructions stored in a non-transitory computer-readable medium running on a computing device comprising the processor for executing the instructions from the non-transitory computer-readable medium, wherein the web page content management tool comprises;

a website having at least one web page, wherein the website is operatively connected to a satellite application programming interface such that the satellite application programming interface collects information about the at least one web page and renders content on the at least one web page, a base web application which provides a re-sizable iframe wherein the base web application is operatively connected to the satellite application programming interface such that the satellite application programming interface forwards the information about the at least one web page to the base web application, wherein the at least one web page and the satellite application programming interface are embedded in the iframe by the base web application such that the base web application, the satellite application programming interface, and the iframe are used to render content from the base web application on the at least one web page in the iframe, and a user interface operatively connected to the base web application such that the base web application provides an overlay on the user interface based upon the information about the at least one web page, wherein the user interface overlay is configured to provide a user with an ability to modify a content associated with the at least one web page through manual interaction with the overlay by the user, wherein a size of the iframe is dynamically adjusted by the base web application in response to a manual size adjustment of the overlay by the user such that the iframe and the overlay are concurrently displayed on a display on the user interface at the same time in different areas of the display, and wherein the user interface and the base web application exchange a message regarding the modification in the content associated with the at least one web page in response to the manual interaction with the overlay by the user such that the message is further dynamically exchanged between the base web application and the at least one web page via the satellite application programming interface in order to render the modification in the content on the at least one web page by the satellite application programming interface.

13. The system of claim 12, wherein the web page content management tool is configured to scale the iframe within the base web application to resize the iframe within the base web application in response to an input provided by the user to the user interface.

14. The system of claim 12, wherein the web page content management tool is configured to reposition the iframe within the base web application in response to an input provided by the user to the user interface.

15. The system of claim 12, wherein the iframe assists the user in adding, removing, or prepositioning an element of content associated with the at least one web page.

16. The system of claim 12, wherein the user interface is configured to generate a message regarding an event or data in response to one or more of the user resizing the at least one web page, the user repositioning an element of content on the at least one web page, the user adding an element of content to the at least one web page or the user removing an element of content from the at least one web page.

17. The system of claim 16, wherein the generated message is a JavaScript post message.

* * * * *